(12) United States Patent
Rysewyk et al.

(10) Patent No.: US 7,699,024 B2
(45) Date of Patent: Apr. 20, 2010

(54) MILK TEMPERATURE MONITOR WITH AMBIENT TEMPERATURE COMPENSATION

(76) Inventors: Terry P. Rysewyk, W8088 CTH NA, Holmen, WI (US) 54636; Darcy J. Roberts, 71-1231 Millwood Avenue, Brockville, Ontario (CA) K6V 6J4

( * ) Notice: Subject to any disclaimer, the term of this patent is extended or adjusted under 35 U.S.C. 154(b) by 460 days.

(21) Appl. No.: 11/523,918

(22) Filed: Sep. 20, 2006

(65) Prior Publication Data
US 2008/0066685 A1    Mar. 20, 2008

(51) Int. Cl.
A01J 5/01    (2006.01)
A01J 5/013    (2006.01)

(52) U.S. Cl. .................. 119/14.08; 119/14.14

(58) Field of Classification Search .............. 119/14.14, 119/14.08, 14.18, 14.09
See application file for complete search history.

(56) References Cited

U.S. PATENT DOCUMENTS

| | | | |
|---|---|---|---|
| 3,703,884 A * | 11/1972 | Maddalena et al. ......... 119/520 |
| 3,874,337 A * | 4/1975 | Umbaugh et al. ........ 119/14.15 |
| 4,034,713 A | 7/1977 | Umbaugh |
| 4,112,758 A | 9/1978 | Heidecker |
| 4,149,489 A | 4/1979 | Umbaugh et al. |
| 4,463,353 A | 7/1984 | Kuzara |
| 4,532,892 A | 8/1985 | Kuzara |
| 4,593,649 A * | 6/1986 | Britten ................... 119/14.08 |
| 4,793,285 A | 12/1988 | Marshall |
| 4,838,207 A | 6/1989 | Bom et al. |
| 4,873,943 A | 10/1989 | Pulvermacher |
| 4,941,433 A | 7/1990 | Hanauer |
| 5,042,428 A | 8/1991 | Van Der Lely et al. |
| 5,069,160 A | 12/1991 | Street et al. |
| 5,080,040 A | 1/1992 | Van Der Lely et al. |
| 5,568,788 A | 10/1996 | Van Den Berg et al. |
| 5,718,186 A | 2/1998 | Van Der Lely |
| 5,771,837 A | 6/1998 | Van Der Lely |
| 5,816,190 A | 10/1998 | Van Der Lely |
| 5,877,417 A | 3/1999 | Arvidson et al. |
| 5,957,081 A * | 9/1999 | van der Lely et al. .... 119/14.09 |
| 5,996,529 A | 12/1999 | Sissom et al. |

(Continued)

FOREIGN PATENT DOCUMENTS

GB    2007486    5/1979

(Continued)

*Primary Examiner*—Rob Swiatek
*Assistant Examiner*—Kristen C Hayes
(74) *Attorney, Agent, or Firm*—www.bobharter.com; Robert J. Harter

(57) ABSTRACT

A milk temperature monitor helps determine the health or physiological condition of a lactating animal (e.g., cow, goat, sheep, camel, etc.). It does this by comparing the temperature of the animal's milk to an acceptable temperature range that is automatically adjusted to compensate for a varying ambient air temperature. In some embodiments, the acceptable temperature range is adjusted based on the average milk temperature reading of the most recent series of animals that were milked. The average reading is preferably a rolling average of a limited sample size. In calculating the rolling average, the monitor disregards temperature readings that are beyond a reasonable range. The monitor can record and display historical peak temperatures rather than real-time temperatures. In some cases, the monitor's microprocessor and power supply are hermetically encapsulated within a clear permanent cast housing. Proximity switches within the housing provide a means for inputting user-selectable parameters into the microprocessor.

5 Claims, 3 Drawing Sheets

U.S. PATENT DOCUMENTS

| | | | |
|---|---|---|---|
| 6,044,793 A | 4/2000 | Van Der Lely | |
| 6,378,455 B1 | 4/2002 | Postma et al. | |
| 6,405,672 B1 * | 6/2002 | De Mol et al. | 119/14.15 |
| 6,604,053 B2 | 8/2003 | Fematt | |
| 6,776,119 B2 * | 8/2004 | Vijverberg et al. | 119/14.14 |
| 6,823,817 B2 * | 11/2004 | van den Berg et al. | 119/14.02 |
| 6,981,466 B2 * | 1/2006 | Lindholm | 119/14.02 |
| 2002/0124803 A1 * | 9/2002 | Chen et al. | 119/14.08 |
| 2002/0148408 A1 * | 10/2002 | Gompper et al. | 119/14.14 |
| 2003/0019432 A1 * | 1/2003 | van den Berg et al. | 119/14.02 |
| 2003/0061994 A1 * | 4/2003 | Vijverberg et al. | 119/14.15 |
| 2003/0226512 A1 * | 12/2003 | van den Berg | 119/14.43 |
| 2003/0230243 A1 * | 12/2003 | Van Der Lely et al. | 119/14.08 |
| 2004/0107913 A1 * | 6/2004 | Veenstra et al. | 119/14.51 |
| 2004/0168644 A1 * | 9/2004 | Lindholm | 119/14.02 |
| 2004/0244700 A1 * | 12/2004 | Schulze-Wartenhorst | 119/14.47 |
| 2007/0209595 A1 * | 9/2007 | Umegard et al. | 119/14.02 |
| 2007/0289536 A1 * | 12/2007 | Dunn et al. | 119/14.14 |

FOREIGN PATENT DOCUMENTS

| | | |
|---|---|---|
| GB | 1383038 | 2/1995 |
| NL | 9001689 | 9/1991 |
| WO | WO 8101612 A1 * | 6/1981 |

* cited by examiner

MILK TEMPERATURE MONITOR WITH AMBIENT TEMPERATURE COMPENSATION

BACKGROUND OF THE INVENTION

1. Field of the Invention

The subject invention generally pertains to monitoring the milk temperature of a lactating animal and more particularly to a way of identifying a truly unusual or abnormal temperature.

2. Description of Related Art

Monitoring the temperature of milk from a lactating animal (cow, goat, sheep, camel, and other mammals) can be done to help determine the physiological condition of the animal. Such animals, and particularly cows, are often milked in a tie-stall barn or barn parlor. In some cases, the air temperature in the barn can vary widely, both seasonally and throughout the day. The barn's temperature can affect the temperature of the animal's milk via the ambient air influencing the animal's body temperature or by heat transfer between the ambient air and the milking equipment that conveys the milk from the animal. So, it can be difficult to determine whether an abnormal milk temperature is due to the animal being sick or the animal simply being in a barn that is particularly warm or cold.

Although many milk temperature monitors have been developed, they fail to effectively overcome the problem of varying ambient temperatures. Moreover, some milk temperature sensors rely on support from large sophisticated computerized systems that are used not only for monitoring milk temperature but are also used for controlling other milking-related functions. Such systems can be expensive and cumbersome, which can make them impractical for small independent dairy farmers. Consequently, a need exists for a better milk temperature monitor.

SUMMARY OF THE INVENTION

It is an object of the present invention to provide a milk temperature monitor that compensates for variations in ambient air temperature.

Another object of some embodiments is to indirectly determine a change in the ambient air temperature by statistically analyzing the milk temperature of a series of animals, wherein the animals and the milking equipment used for milking them are exposed to the ambient air.

Another object of some embodiments is to indirectly determine a change in the ambient air temperature by calculating a rolling average of the peak milk temperatures of a series of cows exposed to that ambient air.

Another object of some embodiments is to indirectly determine a change in the ambient air temperature by calculating a rolling average of the peak milk temperatures of a plurality of milkings of a single cow.

Another object of some embodiments is to consider the ambient air temperature without having to sense the actual air temperature at a location that is remote from where the milk temperature is being sensed. Thus, a milk temperature monitor with ambient temperature compensation can be made relatively compact and portable.

Another object of some embodiments is to sense milk temperature and consider the affects of ambient air temperature by using a monitor that includes just one temperature sensor.

Another object of some embodiments is to provide a hermetically sealed milk temperature monitor by potting the monitor in a transparent resin that allows an alphanumeric display, graphical symbol or lights to be seen through the potting material itself.

Another object of some embodiments is to provide a self-powered milk temperature monitor that is unencumbered by wires connected to a pulsator or from other power sources of a milking machine.

Another object of some embodiments is to provide a self-powered milk temperature monitor that is unencumbered by wires connected to an external power source.

Another object of some embodiments is to provide a self-powered milk temperature monitor that is unencumbered by wires connected to a pulsator of a milking machine.

Another object of some embodiments is to provide a milk temperature monitor that displays a continuously updated historical peak temperature rather than displaying the current temperature of the milk.

Another object of some embodiments is to calculate statistical values based on milk temperature data that disregard extreme milk temperature readings.

Another object of some embodiments is to change an operating parameter of a hermetically sealed milk temperature monitor by using a proximity input switch that is embedded within the monitor.

Another object of some embodiments is to provide a milk temperature monitor that can be used in a tie-stall barn as a self-powered, single-unit device that can be moved from one animal stall to the next, or the monitor can be externally powered and be one of many used in a barn parlor where each animal stall has its own dedicated milk temperature monitor.

Another object of some embodiments is to provide a milk temperature monitor that can be readily installed to sense the temperature of milk from a single teat or a mixture of milk from a plurality of teats.

One or more of these and/or other objects of the invention are provided a milk temperature monitor that compensates for ambient air temperature.

DESCRIPTION OF THE PREFERRED EMBODIMENT

Figure 1:
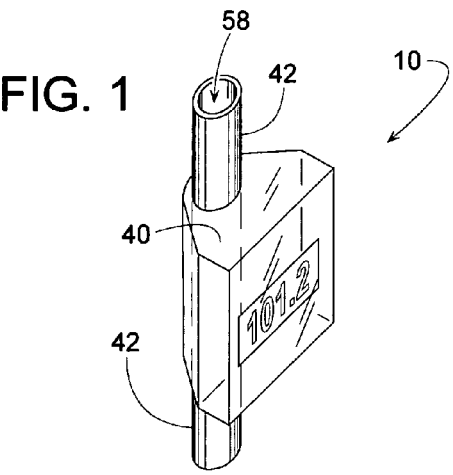
FIG. 1 is a perspective view of a novel milk temperature monitor.
Figure 2:
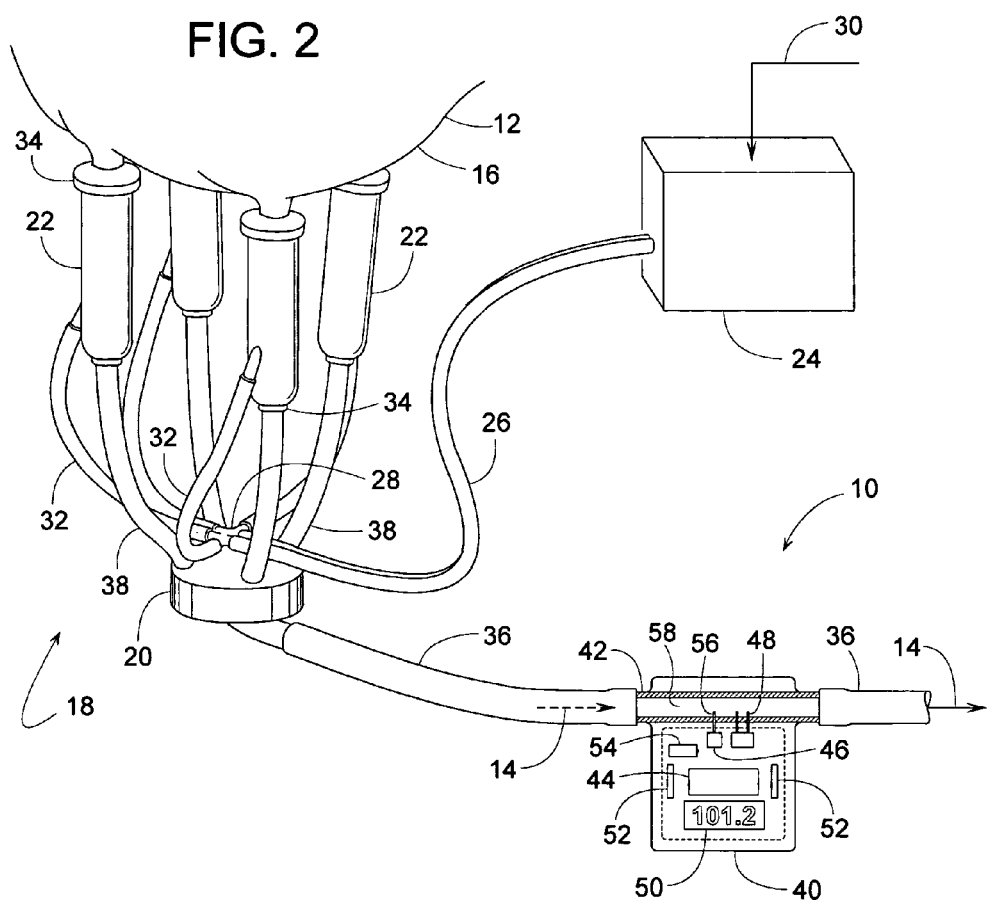
FIG. 2 is a perspective view of a milking process using a milk temperature monitor, wherein many of the monitor's components are schematically illustrated.
Figure 3:
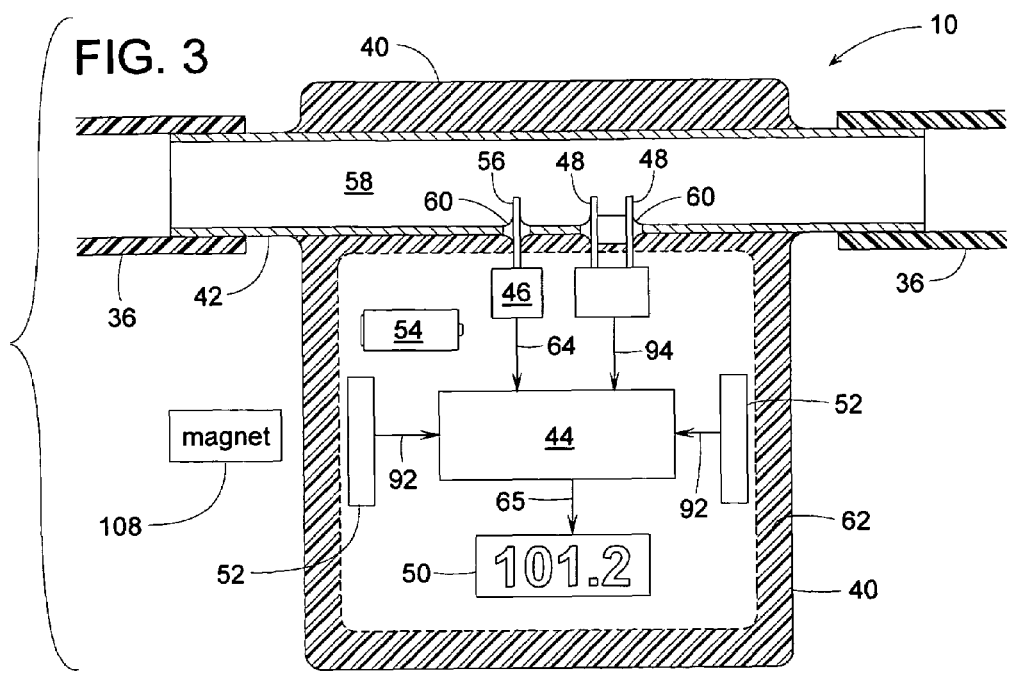
FIG. 3 is a cross-sectional view of a milk temperature monitor with many of its components schematically illustrated.

A milk temperature monitor 10 shown in FIGS. 1-3, can be used for evaluating the health or physiological condition of a lactating animal 12. Examples of animal 12 include a cow, goat, sheep, camel, and other mammals. As milk 14 is being drawn from the animal's udder 16, monitor 10 senses the temperature of the milk and compares it to an acceptable temperature range that has an upper and/or lower temperature limit. The upper and lower limits can be initially set based on the species of animal 12; however, monitor 10 can automatically adjust the limits based on the effects of an ambient air temperature to which animal 12 is exposed.

In one embodiment of the invention, monitor 10 is a self-powered, retrofit unit that can be used in conjunction with an existing conventional milking machine 18. Although the structure and function of milking machines may vary, in this particular example, milking machine 18 comprises a claw 20 with four standard teat cups 22 that draw milk 14 from four teats of the animal's udder 16.

To stimulate or massage the teats, an electrically controlled valve system 24, known in the industry as a "pulsator," provides alternating air pressure (e.g., alternates between atmospheric pressure and a partial vacuum) that one or more hoses 26 convey to a manifold 28 on claw 20. Pulsator 24 is typically powered by an external source 30 of electrical power. Manifold 28 distributes the pulsating air to a series of pulse tubes 32 that feed an annular chamber in each teat cup 22. Each annular chamber surrounds a flexible tubular liner 34 that fits snugly around a teat. In response to the pulsating pressure/vacuum, each tubular liner 34 expands and constracts about a teat to stimulate or massage it.

In addition pulsator 24, a vacuum pump (not shown) creates a generally continuous vacuum in a milk hose 36 that leads from claw 20. Claw 20 includes a series of milk tubes 38 that places the outlet of each teat in fluid communication with milk hose 36 so that the vacuum in hose 36 sucks the milk from within liner 34 of each teat cup 22, and subsequently conveys the milk to a storage tank for later treatment and distribution.

To monitor the health or physiological condition of animal 12, milk temperature monitor 10 is preferably connected in series-flow relationship with milk hose 36 to obtain a composite temperature reading of a mixture of milk coming from all four quarters of the animal's udder. Alternatively, monitor 10 can be connected in series with any one of the four milk tubes 38.

Although the actual design of milk temperature monitor 10 may vary, in a currently preferred embodiment, temperature monitor 10 comprises a housing 40, a tube 42 for conveying milk 14, a controller (e.g., a microprocessor 44), a temperature sensor 46 (e.g., a thermister), an automatic active/standby switch (e.g., electrical conductivity probes 48 that can sense the presence of milk 14 in tube 42, motion sensor, optical sensor, etc.), a display 50 (e.g., alphanumeric, graphical, and/or indicator lights), and one or more proximity switches 52 (e.g., magnetically actuated reed switch, Hall effect sensor, touch-sensitive switch, etc.).

All the electrical components of temperature monitor 10 can be powered by a dedicated power source 54, such as a battery. The dedicated power source 54 allows monitor 10 to be used as a retrofit device that can operate without having to depend on an external power source or be wired to the pulsator's power source 30. Power source 54 can be a battery model number TL-5955 provided by Tadiran of Port Washington, N.Y.

To sense the temperature and conductivity of milk 14, one or more holes in the side of tube 42 allow a probe 56 of temperature sensor 46 and conductivity probes 48 to protrude into a milk passageway 58 of tube 42. A sealant 60 fills any gaps between tube 42 and the protruding probes 48 and 56. Sealant 60 is preferably a USP Class 6 material such as "STERalloy," which is a product of Hapco, Inc. of Hanover, Mass. Tube 42 can be made of polycarbonate or any other suitable material.

The actual arrangement of the monitor's components may vary. FIG. 3 schematically illustrates the functional relationship of the components, while FIG. 1 shows the actual physical appearance of a currently preferred embodiment.

Housing 40 is preferably made from a clear castable resin 62, which serves several functions. One, resin 62 holds tube 42 and the rest of temperature monitor 10 together. Two, resin 62 hermetically seals the entire unit to protect it from liquid, dust and other contaminants. And, three, the resin provides a clear protective coating over the face of display 50. Resin 62 can be any suitable castable material such as DURAMOULD Clear Cast, which is a product of Hyperlast Limited of Derbyshire, UK.

The operation of monitor 10 is controlled by microprocessor 44, which can be an MSP430F423 provided by Texas Instruments of Dallas, Tex. Microprocessor 44 can be programmed to provide an output signal 65 that drives display 50 in response to a temperature signal 64 from sensor 46. Signal 64 represents a milk temperature value that varies with the temperature of the milk or any other fluid contacting the temperature sensor's probe 56. The actual programming of microprocessor 44 and its wiring to various input and output components are well known to those of ordinary skill in the art.

Figure 4:
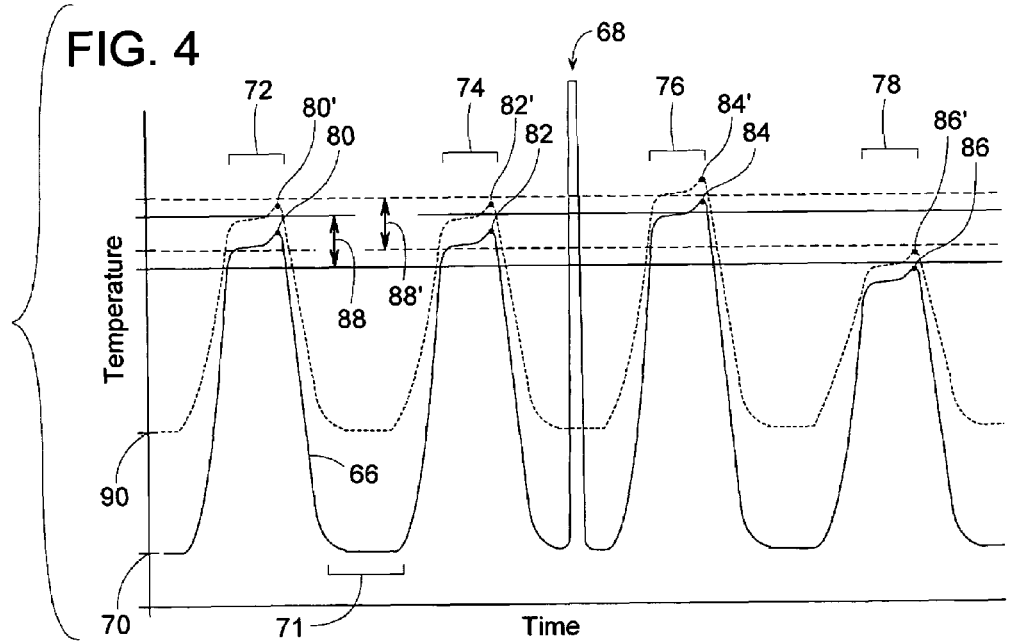
FIG. 4 is a graph illustrating a method of monitoring milk from a lactating animal.

When temperature monitor 10 is installed as shown in FIG. 2, a possible mode of operation might be as shown in FIG. 4. Plot 66 represents the fluid temperature in tube 42 varying over time as a series of cows are sequentially milked. Depending on the current conditions, the fluid sensed by temperature sensor 46 can be milk 14 or air. In some cases, the fluid may also include hot water for cleaning and sanitizing the lines between milkings. Area 68 of plot 66 represents a hot water rinse period, and area 71 represents a period where milk hose 36 is generally dry between milkings. Microprocessor 44 disregards the temperature readings during periods 68 and 71, as the sensed temperatures at these times are extreme and well beyond a predetermined reasonable temperature range for a living mammal.

Temperature 70 represents the ambient air temperature that surrounds and perhaps fills tube 42 when no cow is being milked. Under the current ambient conditions, temperature 70 is relatively cold compared to a cow's body and milk temperature. Periods 72, 74, 76 and 78 correspond to four separate cows being milked sequentially. In this case, relevant temperature points 80, 82, 84 and 86 are the peak historical milk temperatures, which are the maximum temperature readings during a given milking period. A dairy farmer will likely desire the peak historical milk temperatures all lay within an acceptable temperature range 88.

In this first example, cows being milked during periods 72 and 74 are considered normal since points 80 and 82 fall within range 88. Cows being milked during periods 76 and 78, however, are considered abnormal or unusual because points 84 and 86 are beyond range 88. The term, "abnormal" simply refers to a reading that is beyond a certain acceptable range and does not necessarily mean the animal is ill. In some cases, for instance, an abnormal reading may be due to the animal being in heat, which of course can be normal for an animal.

In a currently preferred embodiment of the invention, microprocessor 44 controls monitor 10 to display the peak milk temperature (e.g., points 80, 82, 84 or 86) during the milking of an individual cow; however, displaying other relevant temperatures such as the actual or average milk temperature is also well within the scope of the invention. If microprocessor 44 determines that the peak milk temperature (or other chosen relevant temperature) is abnormal for being beyond range 88, microprocessor 44 provides a notice or warning via display 50 or some other visual or audible means. Display 50, for example, might display the peak temperature as a flashing number.

Initially or after predetermined long periods of nonuse (e.g., after 12 hours), microprocessor 44 could perhaps define the acceptable temperature range based on default values that are appropriate for the subject animal species. For cows, the default acceptable temperature range might be 100° F. to 102.5° F. Eventually, however, microprocessor 44 can effectively adjust the acceptable temperature range to compensate for variable ambient temperature conditions or for other reasons. The expression, "effectively adjust the acceptable temperature range" with particular emphases of the term, "effectively" means that some change or correction in a temperature-related value provides an end result that is similar to the end result that can be achieved if the acceptable temperature range is actually changed. For example, adjusting the value of the temperature reading upward while leaving the acceptable temperature range alone could provide substantially the same end result as adjusting the acceptable temperature range downward while leaving the value of the temperature reading alone.

In a currently preferred embodiment, microprocessor 44 defines and adjusts the acceptable temperature range based on statistically evaluating a predetermined number of sequentially milked animals. Abnormal readings beyond an acceptable temperature range, for example, can be defined as peak temperature readings that exceed 1.5 standard deviations from an average of the peak temperature readings that were recorded during the most current milking periods of the last eight cows.

Establishing and adjusting the acceptable temperature range in this manner is represented by the dashed lines of FIG. 4. In the initially explained scenario, the ambient air temperature is at point 70, and the acceptable temperature range is at range 88. In this second example, the ambient air temperature is at point 90, which is much higher than in the first case. Although mammals tend to maintain their body temperature relatively constant, the significantly higher ambient air temperature can slightly raise a cow's body and its milk temperature, as indicated by the slightly higher peak milk temperatures 80', 82', 84' and 86'. In addition, heat exchange between the ambient air and the milk in milking machine 18 can also affect the milk's temperature. To compensate for the ambient air temperature, microprocessor 44 adjusts the acceptable temperature range to a new range 88' such that its upper and lower temperature limits are at 1.5 standard deviations from the average of temperature peaks 80', 82', 84' and 86'. To provide a milk temperature monitor that is more or less discriminating or sensitive, values higher or lower than 1.5 standard deviations can be used.

By taking an average of the peak milk temperatures, wherein the average is calculated as a rolling average of a certain sample size of animals, microprocessor 44 can update the acceptable temperature range every time another animal is milked. In a currently preferred embodiment, the average peak milk temperature is based on sampling the last eight animals that were milked. The actual sample size can be other than eight. A larger sample size may provide an acceptable temperature range that is more relevant, but a smaller sample size might make monitor 10 more responsive to changing ambient conditions.

In some versions of the invention, the sample size and the value of the standard deviation used for defining the upper and lower limits of the acceptable temperature range are user-selectable parameters that can be entered into microprocessor 44 via proximity switches 52. In some embodiments, for example, a user moves a simple magnet 108 in the vicinity of switches 52 as a means for communicating binary bits of information via a user-actuated signal 92 to microprocessor 44, which in turn interprets the information as originally programmed to do so. This same means of communication can be used for providing microprocessor 44 with other parameter settings and information, such as whether display 50 provides temperature readings in Fahrenheit or Celsius. Proximity switches 52 can each be a model MDSR-412-23 magnetic reed switch provided by Hamlin Electronics of Norfolk, UK.

In cases where the temperature monitor is battery powered, that power can be conserved by automatically setting microprocessor 44 to a low power-consuming standby state whenever monitor 10 is inactive between milkings. When a milking cycle begins, microprocessor 44 shifts to an active state to perform operations such as driving display 50 and monitoring signal 64 from temperature sensor 46. Automatically switching microprocessor 44 between its operating states can be accomplished by various means including, but not limited to, conductivity probes 48 sensing whether milk is present in tube 42. Since low power consumption is very important when monitor 10 is powered by a permanently installed, nonrechargeable battery, sensing conductivity of the milk is a particularly good means for switching the operating state of microprocessor 44. When the milk in tube 42 establishes electrical continuity between probes 48, this provides microprocessor 44 with a signal 94 that can automatically switch microprocessor 44 to its active state. If desired, the magnitude of signal 94 and thus the conductivity of milk 14 could also be monitored to help evaluate the condition of the lactating animal.

Figure 5:
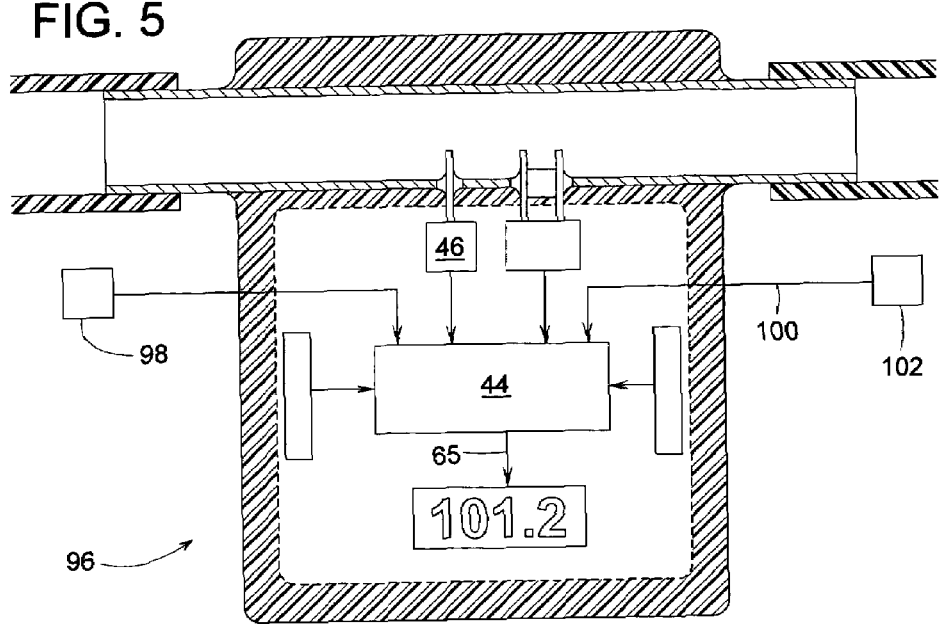
FIG. 5 is a cross-sectional view similar to FIG. 3 but showing an alternate embodiment.

In other cases, shown in FIG. 5, a milk temperature monitor 96 (similar to monitor 10) receives its electrical power from any suitable external source 98. Source 98, for example, can be connected to the same power source 30 that supplies electrical power to pulsator 24.

In addition, milk temperature monitor 96 receives an ambient temperature input signal 100 from an ambient temperature sensor 102. Microprocessor 44 can be readily programmed to use the value of signal 100 to help define an acceptable milk temperature range that compensates for a variable ambient temperature as sensed by milk temperature sensor 46.

Figure 6:
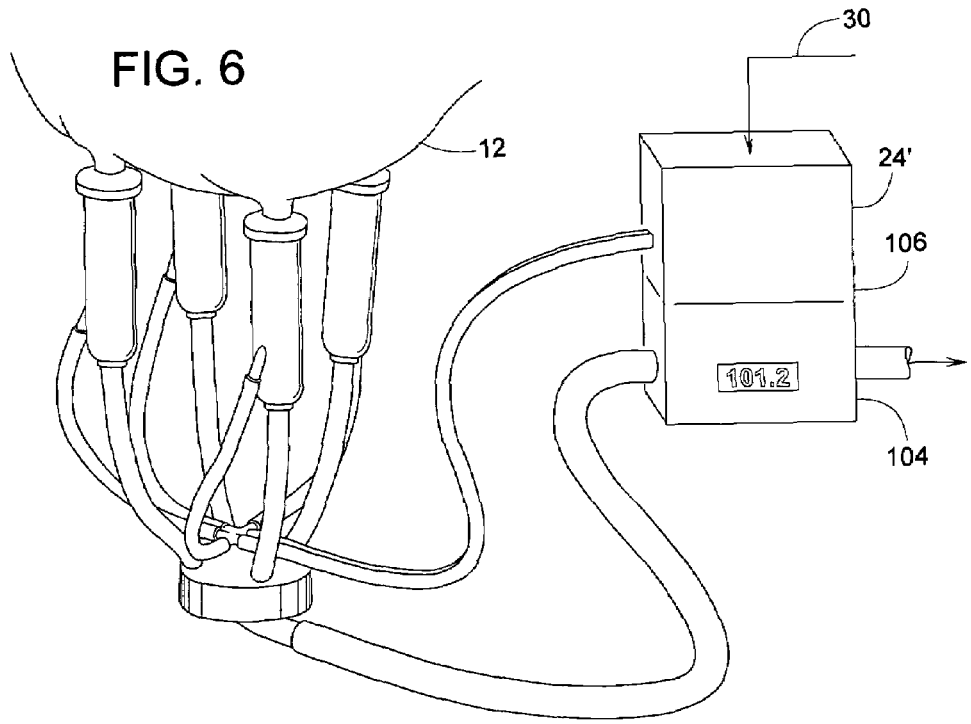
FIG. 6 is a perspective view similar to FIG. 2 but showing an alternate embodiment.

As an alternative to the installation of FIGS. 1 and 5, a milk temperature monitor 104 (similar to monitors 10 and 96) can be combined with a pulsator 24', as shown in FIG. 6. In this example, pulsator 24' and monitor 104 can share the same housing 106 and power source 30.

Although the invention is described with reference to a preferred embodiment, it should be appreciated by those of ordinary skill in the art that various modifications are well within the scope of the invention. The scope of the invention, therefore, is to be determined by reference to the following claims.

The invention claimed is:

1. A milk temperature monitor for sensing the temperature of milk conveyed from a lactating animal of a plurality of lactating animals, wherein the plurality of lactating animals are exposed to a variable ambient temperature, the milk temperature monitor comprising:

a temperature sensor that is in heat transfer relationship with the milk while the milk is conveyed from the lactating animal, the temperature sensor being configured to provide a milk temperature signal representing a milk temperature value that varies with the temperature of the milk;

a controller connected to receive the milk temperature signal from the temperature sensor, the controller being configured to provide an output signal that varies in response to the milk temperature signal; and a display unit connected to receive the output signal from the controller, the display unit providing notice that indicates whether the milk temperature is beyond an acceptable temperature range, wherein the controller effectively adjusts the acceptable temperature range to help compensate for the variable ambient temperature, the controller considering a plurality of milk temperature values corresponding to the plurality of lactating animals, the controller determining the acceptable temperature range based at least partially upon the plurality of milk temperature values, the controller calculating an average milk temperature value associated with the plurality of milk temperature values, the controller determining the acceptable temperature range based at least partially upon the average milk temperature value, the plurality of milk temperature values comprises a plurality of peak temperature values, and the average milk temperature value is an average of the plurality of peak temperature values.

2. A milk temperature monitor for sensing the temperature of milk conveyed from a lactating animal of a plurality of lactating animals, wherein the plurality of lactating animals are exposed to a variable ambient temperature, the milk temperature monitor comprising: a temperature sensor that is in heat transfer relationship with the milk while the milk is conveyed from the lactating animal, the temperature sensor providing a milk temperature signal representing a milk temperature value that varies with the temperature of the milk;

a controller connected to receive the milk temperature signal from the temperature sensor, the controller providing an output signal that varies in response to the milk temperature signal, the controller considering a plurality of milk temperature values corresponding to the plurality of lactating animals, the controller calculating an average milk temperature value associated with the plurality of milk temperature values, the controller determining an acceptable temperature range based at least partially upon the average milk temperature value, the average milk temperature value is a rolling average, the rolling average is at least partially based upon a user-selectable sample size that is manually inputted to the controller; and a display unit connected to receive the output signal from the controller, the display unit providing a notice that indicates whether the milk temperature is beyond the acceptable temperature range, wherein the controller effectively adjusts the acceptable temperature range to help compensate for the variable ambient temperature.

3. A milk temperature monitor for sensing the temperature of milk conveyed from a lactating animal of a plurality of lactating animals, wherein the plurality of lactating animals are exposed to a variable ambient temperature, the milk temperature monitor comprising:

a temperature sensor that is in heat transfer relationship with the milk while the milk is conveyed from the lactating animal, the temperature sensor providing a milk temperature signal representing a milk temperature value that varies with the temperature of the milk;

a controller connected to receive the milk temperature signal from the temperature sensor, the controller providing an output signal that varies in response to the milk temperature signal wherein the controller identifies a relevant temperature based on the temperature signal;

a display unit connected to receive the output signal from the controller, the display unit displaying the relevant temperature, the display unit providing a notice that indicates whether the milk temperature is beyond an acceptable temperature range, wherein the controller effectively adjusts the acceptable temperature range to help compensate for the variable ambient temperature; and a proximity switch electrically coupled to the controller and being responsive to a magnet in proximity with the proximity switch, wherein the proximity switch conveys a user-actuated signal into the controller.

4. The milk temperature monitor of claim 3, wherein the relevant temperature is a historical peak temperature.

5. The milk temperature monitor of claim 3, further comprising a resin that permanently encapsulates the controller and a dedicated power source.

* * * * *